US008981998B2

(12) United States Patent
Orime et al.

(10) Patent No.: US 8,981,998 B2
(45) Date of Patent: Mar. 17, 2015

(54) BUILT-IN TRANSMITTING AND RECEIVING INTEGRATED RADAR ANTENNA

(71) Applicants: Furukawa Electric Co., Ltd., Tokyo (JP); Furukawa Automotive Systems Inc., Shiga (JP)

(72) Inventors: Nobutake Orime, Tokyo (JP); Daisuke Inoue, Tokyo (JP); Naotaka Uchino, Tokyo (JP); Yoichi Iso, Tokyo (JP)

(73) Assignees: Furukawa Electric Co., Ltd., Tokyo (JP); Furukawa Automotive System Inc., Shiga (JP)

( * ) Notice: Subject to any disclaimer, the term of this patent is extended or adjusted under 35 U.S.C. 154(b) by 260 days.

(21) Appl. No.: 13/633,209

(22) Filed: Oct. 2, 2012

(65) Prior Publication Data

US 2013/0027269 A1   Jan. 31, 2013

Related U.S. Application Data

(63) Continuation of application No. PCT/JP2011/055386, filed on Mar. 11, 2011.

(30) Foreign Application Priority Data

Apr. 2, 2010   (JP) ................................. 2010-086390

(51) Int. Cl.
*H01Q 1/38*   (2006.01)
*G01S 7/03*   (2006.01)
(Continued)

(52) U.S. Cl.
CPC ................ *G01S 7/032* (2013.01); *H01Q 1/521* (2013.01); *H01Q 15/006* (2013.01); *H01Q 21/06* (2013.01)
USPC .................................. 343/700 MS; 343/909

(58) Field of Classification Search
CPC ........ H01Q 1/52; H01Q 1/521; H01Q 15/006; H01Q 21/06
USPC ........................... 343/841, 700 MS, 909, 848
See application file for complete search history.

(56) References Cited

U.S. PATENT DOCUMENTS 6,069,581 A   5/2000   Bell et al.
6,232,910 B1   5/2001   Bell et al.
(Continued)

FOREIGN PATENT DOCUMENTS

DE   10 2006 012 452 A1   10/2007
EP   2 551 956 A1   1/2013
(Continued)

OTHER PUBLICATIONS

International Search Report issued Jun. 14, 2011 in PCT/JP2011/055836 filed Mar. 11, 2011 (with English Translation).

(Continued)

*Primary Examiner* — Hoang V Nguyen
(74) *Attorney, Agent, or Firm* — Oblon, McClelland, Maier & Neustadt, L.L.P.

(57) ABSTRACT

Provided is a built-in transmitting and receiving integrated radar antenna whose coverage of a horizontal radiation pattern is widened and whose space factor is improved by integrating high-frequency circuit component onto an antenna substrate while suppressing unnecessary waves. A first dielectric substrate (111) is formed into a three-layered structure in which a bias line (171) of an MIC is disposed between a second layer (111b) and a third layer (111c) and a second ground plane (114) is disposed between the first layer (111a) and the second layer (111b). Also, the second ground plane (114) is conductively connected with isolated through-holes (163, 164), so that a domain in which a feeding port (115) is disposed is isolated from a domain (B) in which the bias line (171) is disposed.

9 Claims, 10 Drawing Sheets

(51) Int. Cl.
*H01Q 1/52* (2006.01)
*H01Q 15/00* (2006.01)
*H01Q 21/06* (2006.01)

(56) References Cited

U.S. PATENT DOCUMENTS

| | | | |
|---|---|---|---|
| 6,348,127 | B1 | 2/2002 | Gallagher et al. |
| 6,380,883 | B1 | 4/2002 | Bell et al. |
| 6,400,308 | B1 | 6/2002 | Bell et al. |
| 6,825,809 | B2 | 11/2004 | Aoki et al. |
| 6,954,177 | B2 | 10/2005 | Channabasappa et al. |
| 7,760,140 | B2 * | 7/2010 | Kamgaing ............ 343/700 MS |
| 7,855,689 | B2 * | 12/2010 | Fukui et al. ................ 343/731 |
| 7,924,227 | B2 | 4/2011 | Yamada |
| 2002/0140609 | A1 | 10/2002 | Aoki et al. |
| 2004/0090368 | A1 | 5/2004 | Channabasappa et al. |
| 2008/0068269 | A1 | 3/2008 | Yamada |
| 2009/0085827 | A1 | 4/2009 | Orime et al. |
| 2009/0153433 | A1 | 6/2009 | Nagai et al. |
| 2011/0134010 | A1 | 6/2011 | Toyao et al. |
| 2013/0241778 | A1 | 9/2013 | Orime et al. |

FOREIGN PATENT DOCUMENTS

| | | |
|---|---|---|
| JP | 10-200326 A | 7/1998 |
| JP | 10-303640 A | 11/1998 |
| JP | 2002-299947 A | 10/2002 |
| JP | 2003-524751 A | 8/2003 |
| JP | 2004-159341 A | 6/2004 |
| JP | 2004-304611 A | 10/2004 |
| JP | 2007-166115 A | 6/2007 |
| JP | 2007-243375 A | 9/2007 |
| JP | 2008-072659 A | 3/2008 |
| JP | 2008-098919 A | 4/2008 |
| JP | 2009-089212 A | 4/2009 |
| JP | 2010-16554 | 1/2010 |
| WO | WO 2010/013496 A1 | 2/2010 |

OTHER PUBLICATIONS

Fan Yang et al., "Microstrip Antennas Integrated with Electromagnetic Band-Gap (EBG) Structures: A Low Mutual Coupling Design for Array Applications," IEEE Transactions on Antennas and Propagation, Oct. 2003, vol. 51, No. 10, pp. 2936-2946 (in English).

Chinese Office Action issued Jan. 30, 2014, in China Patent Application No. 201180015979.4 (with English translation).

Office Action issued Mar. 3, 2014 in Japanese Patent Application No. 2010-086390 (with English language translation).

Extended European Search Report issued Jun. 3, 2014 in Patent Application No. 11765319.6.

Toru Okagaki, et al., "Reduction of mutual coupling in a microstrip patch array fed by a triplate waveguide with EBG elements", IEICE Transactions on Electronics, vol. E89-C, No. 9, XP-001542408, Sep. 1, 2006, pp. 1345-1347.

M. Fallah-Rad, et al., "Gain enhancement in linear and circularly polarised microstrip patch antennas using shorted metallic patches", IEE Proceedings, Microwaves, Antennas and Propagation, vol. 152, No. 3, XP-006024063, Jun. 3, 2005, pp. 138-148.

* cited by examiner

BUILT-IN TRANSMITTING AND RECEIVING INTEGRATED RADAR ANTENNA

TECHNICAL FIELD

The present invention relates to a transmitting and receiving integrated radar antenna configured by integrating transmitting and receiving antennas having a wide covering directivity in a horizontal direction and more specifically to a built-in transmitting and receiving integrated radar antenna in which a bias line of a microwave integrated circuit is built in an antenna substrate.

BACKGROUND ART

With a spread of air-bags and a mandatory requirement to use a seat-belt, a death toll from car traffic accidents is inclining to decrease. However, a number of traffic accidents and a number of persons injured tend to still increase due to an increase of senior drivers along with aging of the society. Under such background, a sensor that detects obstacles around a car to assist driving is now attracting attention, and ultrasonic sensors, cameras, millimeter-wave radars and the like are been commercialized until now.

While a conventional in-vehicle radar system can detect obstacles located in a middle range of 30 meter or less or in a long range of 150 meter or less, the radar system has a problem that its detection error is significant for an obstacle located in a short range of 2 meter or less for example. Accordingly, in order to be able accurately detect obstacles located around the car, it is requested to put an UWB radar that assures a high distance resolution and a wide view field coverage into practical use.

Patent Document 1 discloses an array antenna configured by arraying element antennas by 2×4. The array antenna can measure an azimuth angle in a horizontal direction by a phase comparison monopulse method when it is used as a receiving antenna of the UWB radar. It is also possible to use these element antennas as a transmitting antenna by arraying by 1×4. Such an in-vehicle radar system is strongly demanded so as to be able to realize a wide coverage of a radiation pattern in the horizontal direction and to downsize to improve a space factor. Then, there is a need for a transmitting and receiving integrated antenna configured by disposing and integrating transmitting and receiving antennas on one substrate.

PRIOR ART DOCUMENT

Patent Document

[Patent Document 1] Japanese Patent Application Laid-open No. 2009-89212 Gazette

DISCLOSURE OF INVENTION

Problems to be Solved by the Invention

It is desirable to integrate the transmitting and receiving integrated antenna further with a substrate of a transmitting and receiving microwave integrated circuit (MIC) in order to realize a millimeter wave radar which permits to accurately detect obstacles and whose occupied volume is small, in addition to widening of the bandwidth and coverage of the antenna. Still further, while the MIC requires a bias line for supplying a reference voltage to each circuit, the MIC poses a problem that the MIC is enlarged if all of the bias lines are to be accommodated within the MIC. There arises another problem that the substrate of the transmitting and receiving integrated antenna or of the MIC must be enlarged when other signal lines and semiconductor functional components, other than the bias lines, must be mounted on the transmitting and receiving integrated antenna.

Then, in order to improve the space factor, it is desirable to sterically dispose the signal lines such as the bias lines and the semiconductor functional components (referred to generally as "high-frequency circuit component" hereinafter) to integrate within the substrate of the transmitting and receiving integrated antenna. However, if the high-frequency circuit component is provided within the antenna substrate, there is a problem that the high-frequency circuit component is affected by radio waves from the antenna. So far, no method for integrating a high-frequency circuit component within a substrate of a transmitting and receiving integrated antenna while suppressing such unnecessary waves is known.

Accordingly, the invention is made to solve the abovementioned problems and aims at providing a built-in transmitting and receiving integrated radar antenna that realizes a wide coverage of a horizontal radiation pattern and that improves a space factor by integrating a high-frequency circuit component onto an antenna substrate while suppressing unnecessary waves.

Means for Solving the Problems

According to a first aspect of the invention, a built-in transmitting and receiving integrated radar antenna comprises a transmitting antenna disposed at one end side of one surface of a first dielectric substrate, a receiving antenna disposed at another end side of one surface of the first dielectric substrate, an EBG (Electromagnetic Band Gap) disposed between the transmitting antenna and the receiving antenna on one surface of the first dielectric substrate, a first ground plane formed on another surface of the first dielectric substrate, and a second dielectric substrate disposed on a surface on an opposite side from the first dielectric substrate across the first ground plane, characterized in that a predetermined MIC (microwave integrated circuit) is integrated onto a surface on an opposite side from the first ground plane of the second dielectric substrate, and a predetermined high-frequency circuit component is built in the first dielectric substrate.

According to another aspect of a built-in transmitting and receiving integrated radar antenna of the invention, the high-frequency circuit component is disposed under the EBG and a second ground plane electrically conductive with the first ground plane is disposed between the high-frequency circuit component and the EBG.

According to a still other aspect of a built-in transmitting and receiving integrated radar antenna of the invention, the first dielectric substrate is composed of three layers of dielectrics, the second ground plane is disposed between the dielectric of the first layer and the dielectric of the second layer, and the high-frequency circuit component is disposed between the dielectric of the second layer and the dielectric of the third layer.

According to a further aspect of a built-in transmitting and receiving integrated radar antenna of the invention, the built-in transmitting and receiving integrated radar antenna further comprises partition through-holes conductively connected to the first ground plane by penetrating at least through the first dielectric substrate respectively between the transmitting antenna and the EBG and between the receiving antenna and the EBG, and characterized in that the two partition through-holes are conductively connected with the second ground plane.

According to a different aspect of a built-in transmitting and receiving integrated radar antenna of the invention, the built-in transmitting and receiving integrated radar antenna further comprises partition through-holes conductively connected to the first ground plane by penetrating through the first and second dielectric substrates respectively between the transmitting antenna and the EBG and between the receiving antenna and the EBG, and characterized in that the two partition through-holes are conductively connected with the second ground plane.

According to a still different aspect of a built-in transmitting and receiving integrated radar antenna of the invention, small partition through-holes that conductively connect the first and second ground planes are provided respectively on the transmitting antenna side and the receiving antenna side, and that the high-frequency circuit component is disposed between the small partition through-hole on the transmitting antenna side and the small partition through-hole on the receiving antenna side.

According to a still different aspect of a built-in transmitting and receiving integrated radar antenna of the invention, the transmitting antenna is configured by arraying one or more printed dipole antennas in a row, and the receiving antenna is configured by arraying two or more printed dipole antennas in two rows.

According to a still different aspect of a built-in transmitting and receiving integrated radar antenna of the invention, the transmitting antenna is configured by arraying one or more patch antennas in a row, and the receiving antenna is configured by arraying two or more patch antennas in two rows.

According to a still different aspect of a built-in transmitting and receiving integrated radar antenna of the invention, the patch antenna is an electromagnetic coupling patch antenna connected with a predetermined microwave line by an electromagnetic coupling feeding method.

According to a still different aspect of a built-in transmitting and receiving integrated radar antenna of the invention, the high-frequency circuit component is an either one of a bias line of the MIC, a predetermined signal line, and a semiconductor functional component.

Advantages

According to the invention, it is possible to provide a built-in transmitting and receiving integrated radar antenna whose space factor is improved by integrating high- frequency circuit component onto an antenna substrate while suppressing unnecessary waves.

DESCRIPTION OF EMBODIMENTS

Figure 1A:
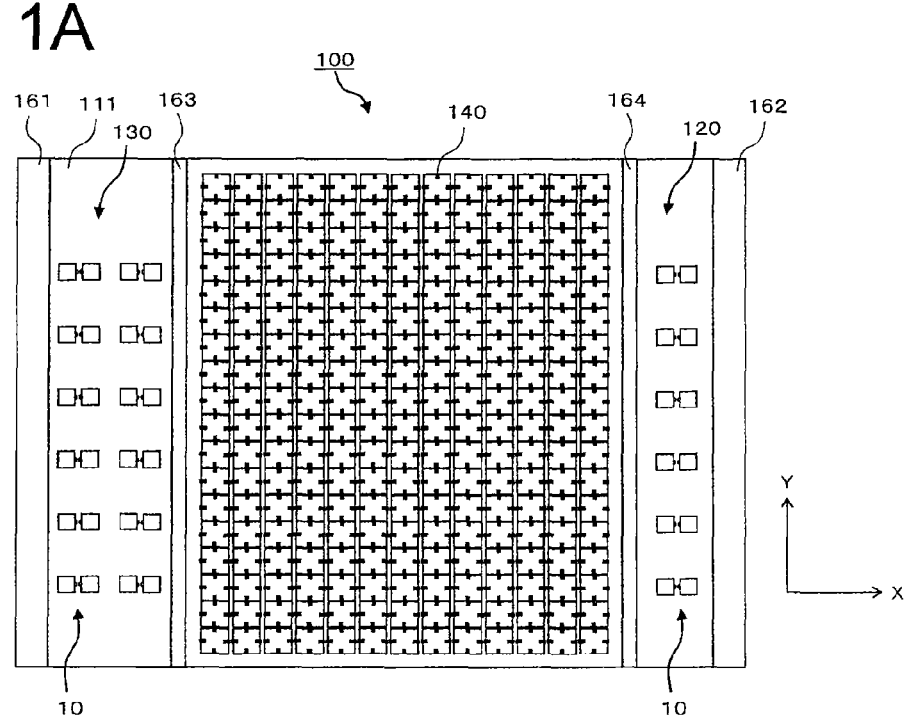
FIGS. 1A and 1B are plan and section views showing a configuration of a built-in transmitting and receiving integrated radar antenna of a first embodiment of the invention.

A preferred embodiment of a built-in transmitting and receiving integrated radar antenna of the invention will be explained below in detail with reference to the drawings. It is noted that components having same or corresponding functions will be denoted by same reference numerals in order to simplify the drawings and an explanation thereof. The built-in transmitting and receiving integrated radar antenna of the invention is configured to be able to realize a wide coverage of a radiation pattern in a horizontal direction and to integrate a high-frequency circuit component onto an antenna substrate while suppressing unnecessary waves.

The high-frequency circuit component integrated onto the antenna substrate includes an either one of a bias line of a MIC, a predetermined signal line, and a semiconductor functional component. The signal line includes a microwave signal line, a high-frequency signal line, a low-frequency signal line, a digital signal line, a voltage control line, and a device control line. The semiconductor functional component includes various MIC microwave devices (LNA, HPA, phase shifter, distributor, ATT (attenuator), chip capacitor, chip resistor, amplifier, and mixer), a thin heat pipe, a heat sink and an A/D converter. The following explanation will be made by exemplifying a bias line of the MIC integrated with the antenna substrate as the high-frequency circuit component integrated onto the antenna substrate.

Figure 2A:
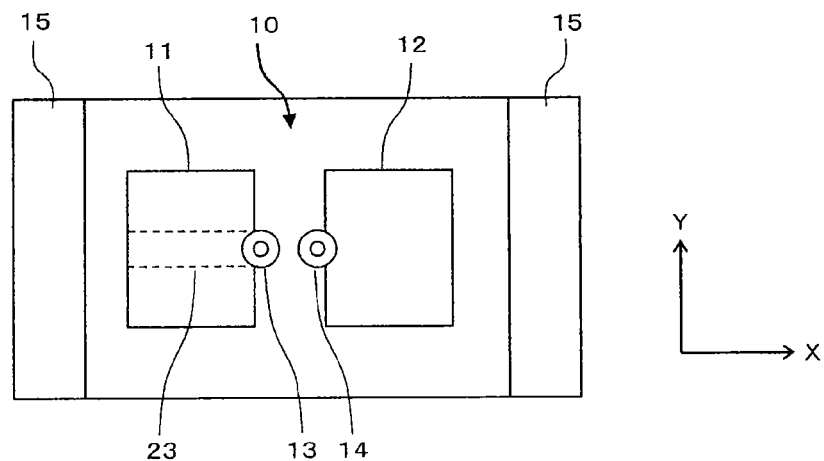
FIGS. 2A and 2B are plan and section views showing a configuration of a printed dipole antenna used as an element antenna of horizontal polarization whose radiation source is a magnetic current.
Figure 2B:
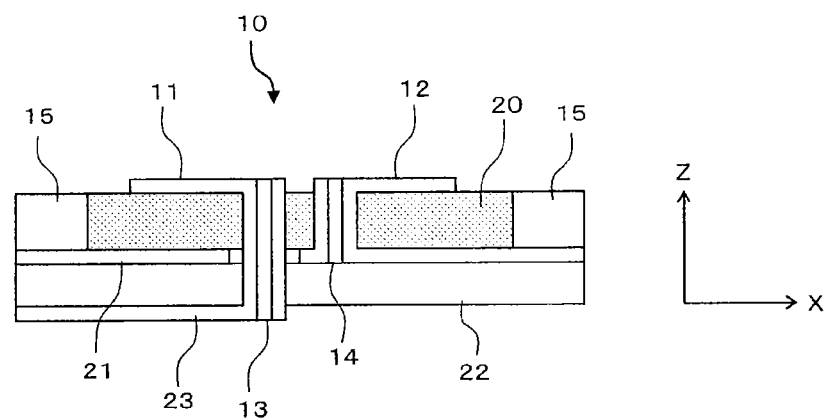

FIGS. 2A and 2B show one example of an element antenna whose bandwidth and coverage are widened. FIGS. 2A and 2B show a configuration of the element antenna 10 of horizontal polarization whose source of radiation is a magnetic current, wherein FIG. 2A is a plan view of the element antenna 10 in which a wide coverage of the a radiation pattern in a horizontal direction is realized and FIG. 2B is a section view thereof taken along a section passing through a feeding through-hole 13 and a grounding through-hole 14. The element antenna 10 is formed as a printed dipole antenna by having first and second elements 11 and 12 on a first dielectric substrate 20. The first element 11 is connected with a microwave line 23 formed on a second dielectric substrate 22 through the feeding through-hole 13 and the second element 12 is connected with a ground plane 21 through the grounding through-hole 14.

Coordinate systems as shown in FIGS. 2A and 2B will be used hereinafter to facilitate the explanation. Here, a direction connecting the first element 11 with the second element 12 will be represented as an X-axis, a direction in parallel with the first dielectric substrate 20 and orthogonal to the X-axis as a Y-axis, and a direction vertical to the first dielectric substrate 20 as a Z-axis. The first and second elements 11 and 12 are arrayed such that an Eθ component of a transmitting wave or a receiving wave is located on an XZ plane.

As shown in FIGS. 2A and 2B, metal plates or EBGs (Electromagnetic Band Gap) 15 are disposed on both side surfaces of the element antenna 10. Transmitting and receiving antennas are configured by using the element antennas 10 and the metal plates or EGBs 15 are disposed on the both side surfaces of the element antennas 10 as shown in FIG. 2. With this arrangement, it is possible to configure a transmitting and receiving integrated radar antenna whose space factor and antenna performance are improved by integrating the transmitting and receiving antennas on one and same substrate.

That is, it is possible to realize the wide coverage of the radiation pattern in the horizontal direction, to suppress unnecessary waves and also to narrow a width in an X direction of the first dielectric substrate 20 by disposing the metal plates or EBGs 15 on the both side surfaces of the element antenna 10. It is also possible to realize a differential pattern suitably used in measuring an angle by suppressing the unnecessary waves such as TM surface waves and others when a phase comparison monopulse antenna configured by using the element antennas 10 is formed on a large substrate.

When transmitting and receiving antennas are disposed on a large substrate, a surface wave is generated on the substrate in general. There is known a method of disposing an EBG between the transmitting and receiving antennas to suppress such surface wave (Reference: Okagaki, et. al., "A Study on EBG-loaded MSA" IEICE Technical Report A, p2005-127 (2005.12)). However, it is difficult to realize the differential pattern suitably used for measuring an angle just by disposing the EBG between the transmitting and receiving antennas in a monopulse antenna that measures an azimuth angle by comparing phases by using sum and differential patterns.

The followings are configurations of antennas that solve the abovementioned problem and can be applied to the phase comparison monopulse system.

Figure 3A:
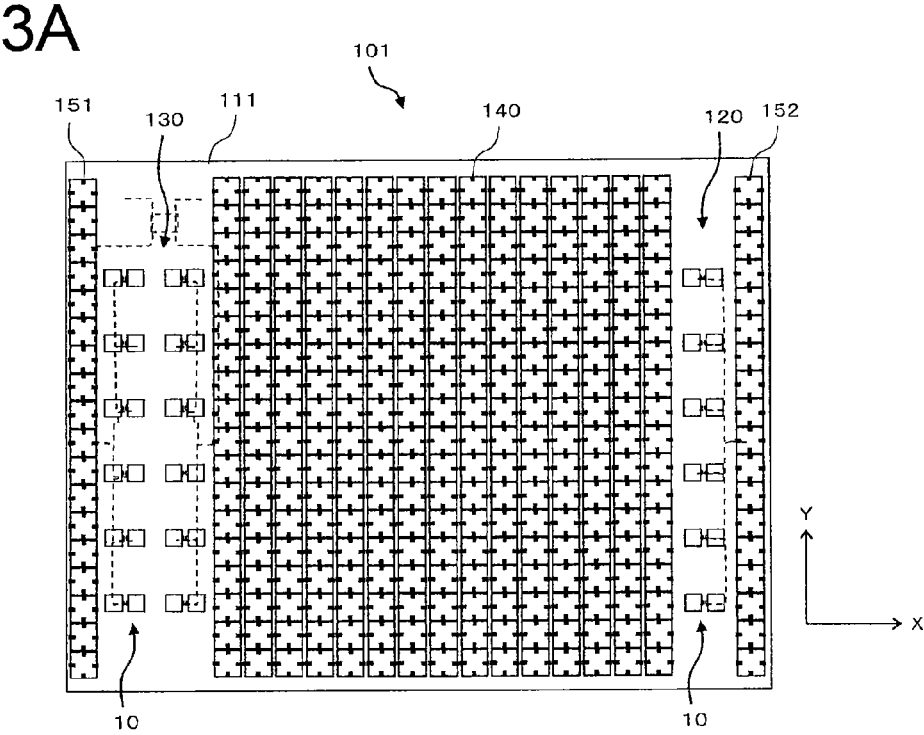
FIGS. 3A and 3B are plan and section views showing one example of a transmitting and receiving integrated antenna having a configuration of EBG—antenna—EBG.
Figure 3B:
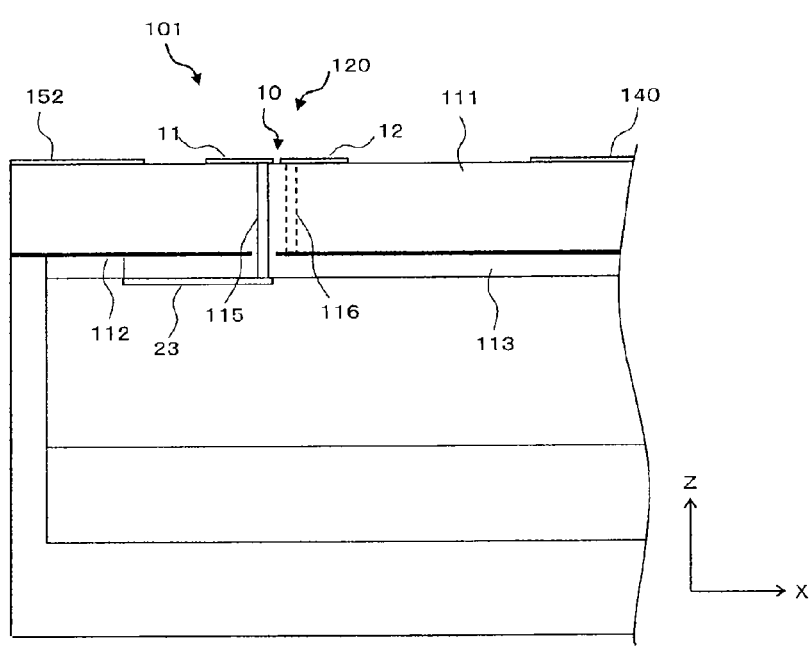

(First Configuration) EBG—Antenna—EBG
(Second Configuration) Rim—Antenna—Partition through-hole—EBG
(Third Configuration) Rim—Antenna—EBG
(Fourth Configuration) EBG—Antenna—Partition through-hole—EBG FIGS. 3A and 3B show one example of the abovementioned transmitting and receiving integrated antenna (first configuration). Transmitting and receiving antennas 120 and 130 are provided on a first dielectric substrate 111 in a transmitting and receiving integrated antenna 101 shown in FIGS. 3A and 3B. The transmitting antenna 120 is configured by the element antennas 10 arrayed by 6×1, and the receiving antenna 130 is configured by the element antennas 10 arrayed by 6×2. In each of the element antennas 10, the first element 11 is connected to a microwave line 23 formed on a second dielectric substrate 113 through a feeding through-hole 115 and the second element 12 is connected to a ground plane 113 through a grounding through-hole 116.

As shown in FIG. 3A, an EBG 140 is disposed between the transmitting antenna 120 and the receiving antenna 130 in the transmitting and receiving integrated antenna 101. Still further, EGBs 151 and 152 are disposed on both end surfaces of the first dielectric substrate 111. With this arrangement, the configuration of the EBG 152, the transmitting antenna 120 and the EBG 140 is formed centering on the transmitting antenna 120, and the configuration of the EBG 151, the receiving antenna 130 and the EBG 140 is formed centering on the receiving antenna 130.

Figure 4A:
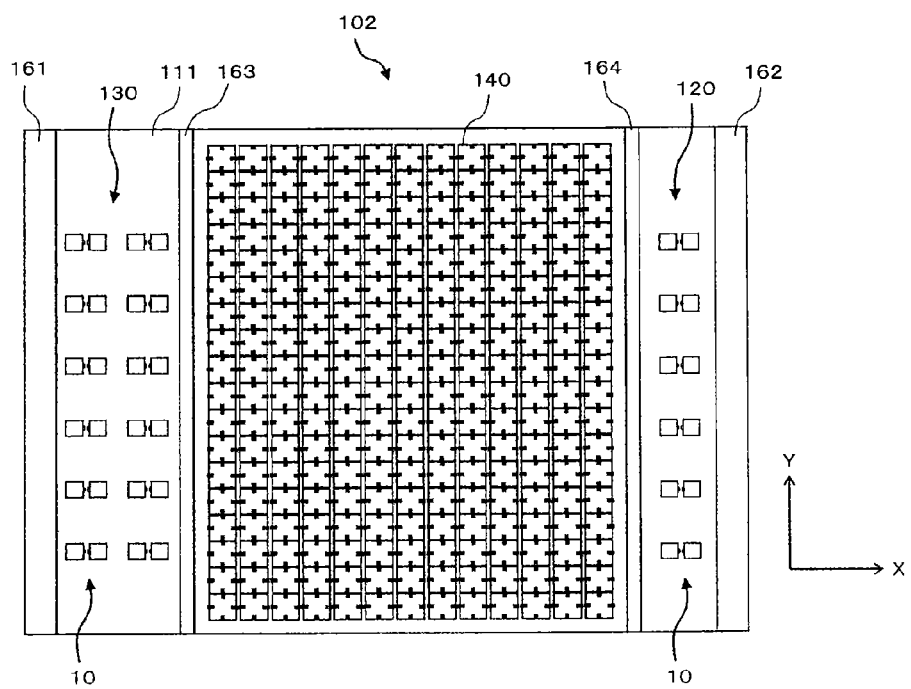
FIGS. 4A and 4B are plan and section views showing one example of a transmitting and receiving integrated antenna having a configuration of rim—antenna—partition through-hole-EBG.
Figure 4B:
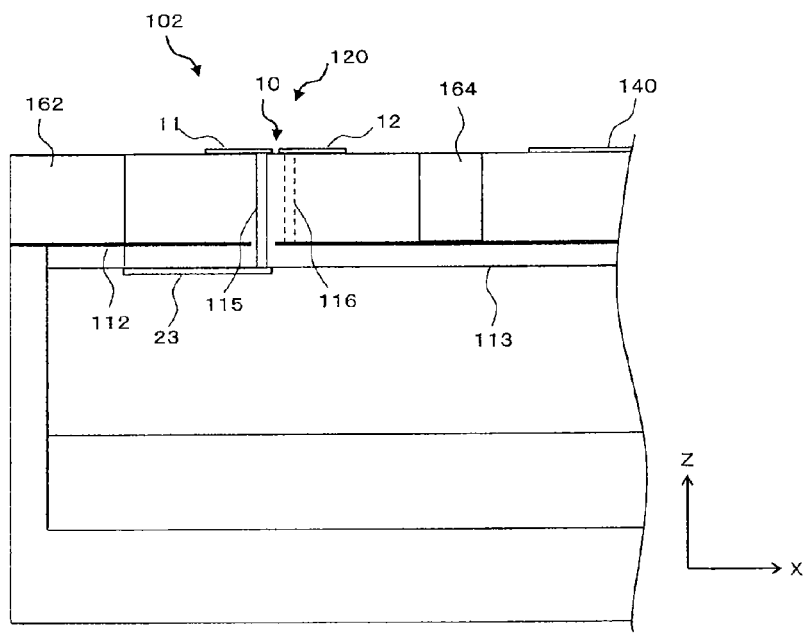

FIGS. 4A and 4B show one example of the abovementioned transmitting and receiving integrated antenna (second configuration). In a transmitting and receiving integrated antenna 102 shown in FIG. 4A, rims 161 and 162 are disposed on the both end surfaces of the first dielectric substrate 111 instead of the EEGs 151 and 152 of the transmitting and receiving integrated antenna 101 shown in FIG. 3A and 3B. Still further, a partition through-hole 164 is provided between the transmitting antenna 120 and the EBG 140, and a partition through-hole 163 is provided between the receiving antenna 130 and the EBG 140. With this arrangement, the configuration of the rim 162, the transmitting antenna 120, the partition through-hole 164 and the EBG 140 is formed centering on the transmitting antenna 120, and the configuration of the rim 161, the receiving antenna 130, the partition through-hole 163 and the EBG 140 is formed centering on the receiving antenna 130.

Figure 5A:
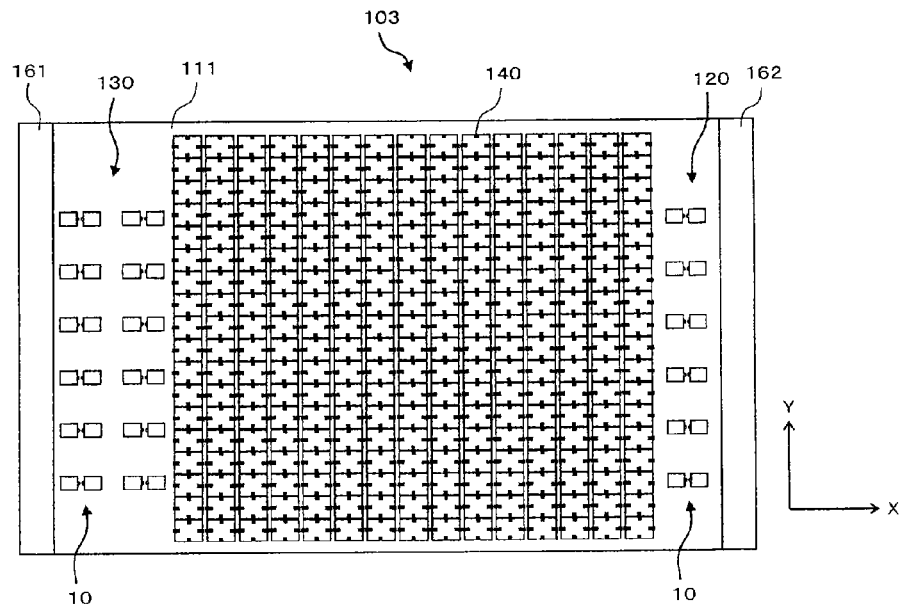
FIGS. 5A and 5B are plan and section views showing one example of a transmitting and receiving integrated antenna having a configuration of rim—antenna—EBG.
Figure 5B:
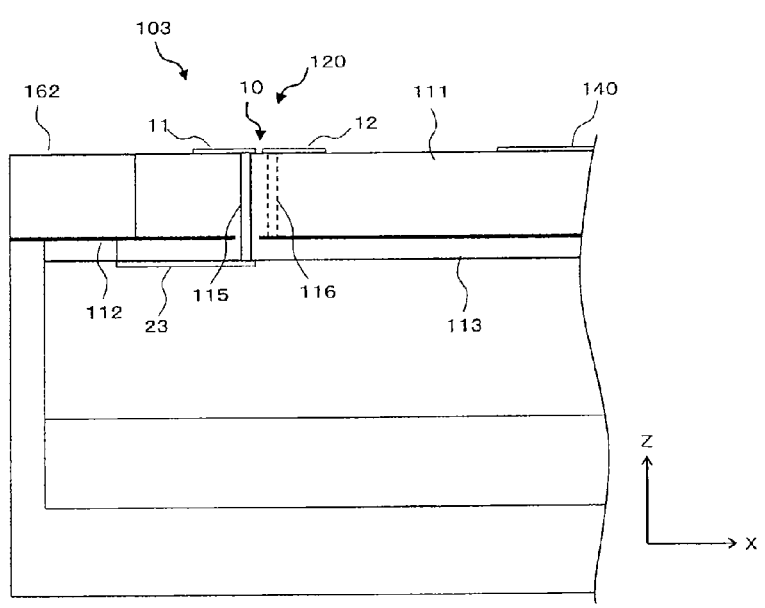

FIGS. 5A and 5B show one example of the abovementioned transmitting and receiving integrated antenna (third configuration). In a transmitting and receiving integrated antenna 103 shown in FIG. 5A, the rims 161 and 162 are disposed on the both end surfaces of the first dielectric substrate 111 instead of the EBGs 151 and 152 of the transmitting and receiving integrated antenna 101 shown in FIG. 3A and 3B. With this arrangement, the configuration of the rim 162, the transmitting antenna 120, and the EBG 140 is formed centering on the transmitting antenna 120, and the configuration of the rim 161, the receiving antenna 130 and the EBG 140 is formed centering on the receiving antenna 130. In the same manner, in the transmitting and receiving integrated antenna (fourth configuration) described above, the EBGs 151 and 152 are disposed on the both end surface of the first dielectric substrate 111 instead of the rims 161 and 162 of the transmitting and receiving integrated antenna 102 shown in FIG. 4A and 4B.

FIGS. 3B, 4B and 5B are partial section views taken along a section passing the feeding port 115 and the grounding port 116 of the transmitting and receiving integrated antennas 101 through 103 (first through third configurations) centering on the transmitting antenna 120. As shown in the respective views, the transmitting and receiving antennas 101, 102 and 103 are all composed of three layers of the first dielectric substrates 111, a first ground plane 112 and a second dielectric ground plane 113.

In the transmitting and receiving antennas 101 through 103 described above, the EBG 140 disposed between the transmitting antenna 120 and the receiving antenna 130 are configured to have a predetermined distance from the first ground plane 112 and to resonate with this arrangement with predetermined frequency. In the same manner, the EBGs 151 and 152 used in the transmitting and receiving integrated antenna 101 are configured to have the distance from the first ground plane 112 and to resonate with the frequency. The rims 161 and 162 of the transmitting and receiving integrated antennas 102 and 103 as well as the partition through-holes 163 and 164 of the transmitting and receiving integrated antenna 102 are all electrically connected with the first ground plane 112.

Figure 6:
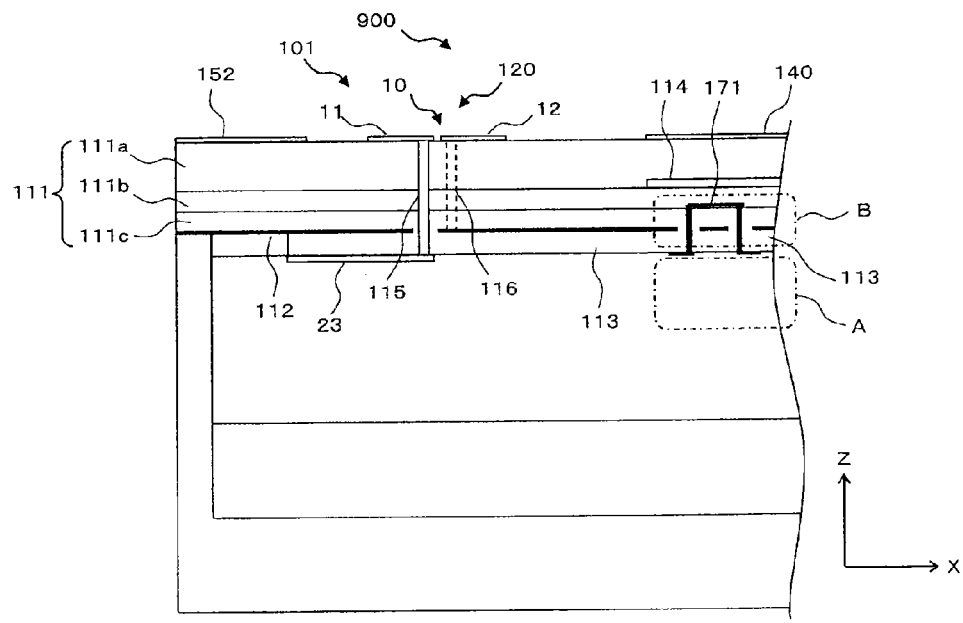
FIG. 6 is a section view showing one example of a built-in transmitting and receiving integrated radar antenna in which a bias line of a MIC is integrated.

The MIC for processing transmitting and receiving waves is disposed in the second dielectric substrate 113 in each transmitting and receiving integrated antenna configured as described above. At this time, a bias line of the MIC is sterically disposed and integrated within the substrate of the transmitting and receiving integrated antenna in order to improve the space factor. FIG. 6 shows one example of the built-in transmitting and receiving integrated radar antenna in which the bias line of the MIC is integrated within the substrate of the transmitting and receiving integrated antenna. FIG. 6 shows an example of the built-in transmitting and receiving integrated radar antenna 900 in which the bias line 171 of the MIC is integrated in the substrate of the transmitting and receiving integrated antenna 101, and the MIC not shown is disposed in a domain A opposing the EBG 140 of the second dielectric substrate 113.

In FIG. 6, the bias line 171 is built in a domain B corresponding to an under part of the EBG 140. The first dielectric substrate 111 is formed into a three-layer structure of a first layer 111a, a second layer 111b and a third layer 111c to built in the bias line 171 in the first dielectric substrate 111. With this arrangement, in the built-in transmitting and receiving integrated radar antenna 900, the EBG 140 and the second ground plane 114 for example are disposed on both surfaces of the first layer 111a of the first dielectric substrate 111, and the bias line 171 is disposed between the second layer 111b and the third layer 111c. Furthermore, the first ground plane 112 and the microwave line 23 for example are disposed on the both surfaces of the second dielectric substrate 113. A five-layered structure is formed in terms of metal layers.

As shown in FIG. 6, the bias line 171 is built in between the EBG 140 and the first ground plane 112. It is necessary to dispose the second ground plane 114 between the EBG 140 and the bias line 171 to make the bias line invisible in terms of radio waves from the side of the EBG 140 as a measure for reducing interference. Then, the first dielectric substrate 111 is formed into a three-layered structure, the second ground plane 114 is disposed between the first layer 111a and the second layer 111b, and the bias line 171 is disposed between the second layer 111b and the third layer 111c. It is noted that the second ground plane 114 is disposed at a position closer to the EBG 140 more than the first ground plane 112 by disposing the second ground plane 114 as described above. As a result, resonance frequency of the EBG 140 is changed, so that it is necessary to redesign such that the EBG 140 resonates with the predetermined resonance frequency with the second ground plane 114.

It is possible to build in the bias line 171 between the first ground plane 112 and the second ground plane 114 by forming the first dielectric substrate 111 into the four-layered structure as the metal layer. However, because the domain B in which the bias line 171 is built in is connected in terms of radio waves with the domain in which the feeding port 115 is provided, there is a possibility that an electric field of the transmitting antenna 120 for example propagates to and affects the domain B.

Figure 7:
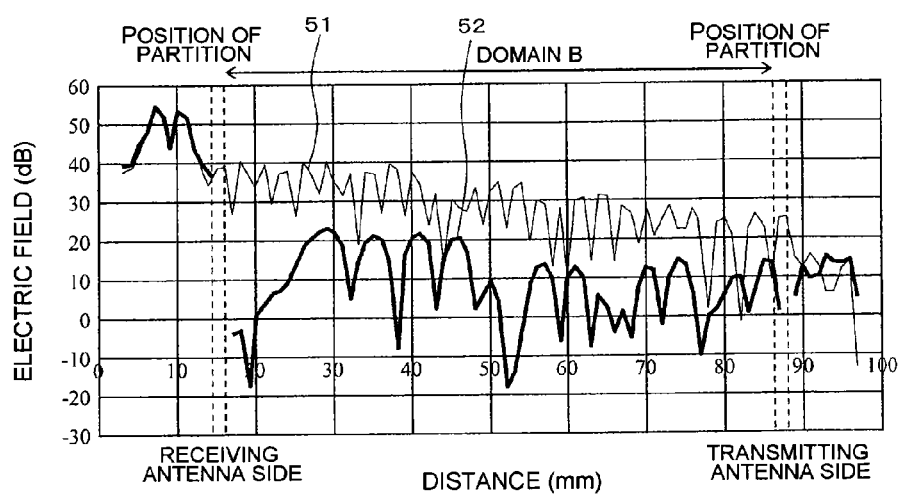
FIG. 7 is a graph showing one example of an analytical result of an electric field leaked into a built-in domain when a receiving antenna is excited.

FIG. 7 shows one example obtained by analyzing the electric field leaked to the domain B when the receiving antenna 130 is excited in the built-in transmitting and receiving integrated radar antenna 900. An axis of abscissa of FIG. 7 represents a distance from the end surface on the side of the receiving antenna 130 of the first dielectric substrate 111 and an axis of ordinate represents the leaked electric field. The bias line 171 is built in the domain B of the first dielectric substrate 111 between the transmitting antenna 120 and the receiving antenna 130. The leaked electric field in the built-in transmitting and receiving integrated radar antenna 900 is denoted by a reference numeral 51 in FIG. 7.

As shown in FIG. 7, the leaked electric field 51 from the receiving antenna 130 does not drop so much in the domain B in the built-in transmitting and receiving integrated radar antenna 900. That is, the leaked electric field 51 drops only about 15 to 29 dB in a section from the domain B at the position separated from the receiving antenna 130 to the transmitting antenna 120. It is preferable for the leaked electric field (unnecessary waves) from the receiving antenna 130 to drop by 35 to 40 dB or more.

(First Embodiment)

Figure 1B:
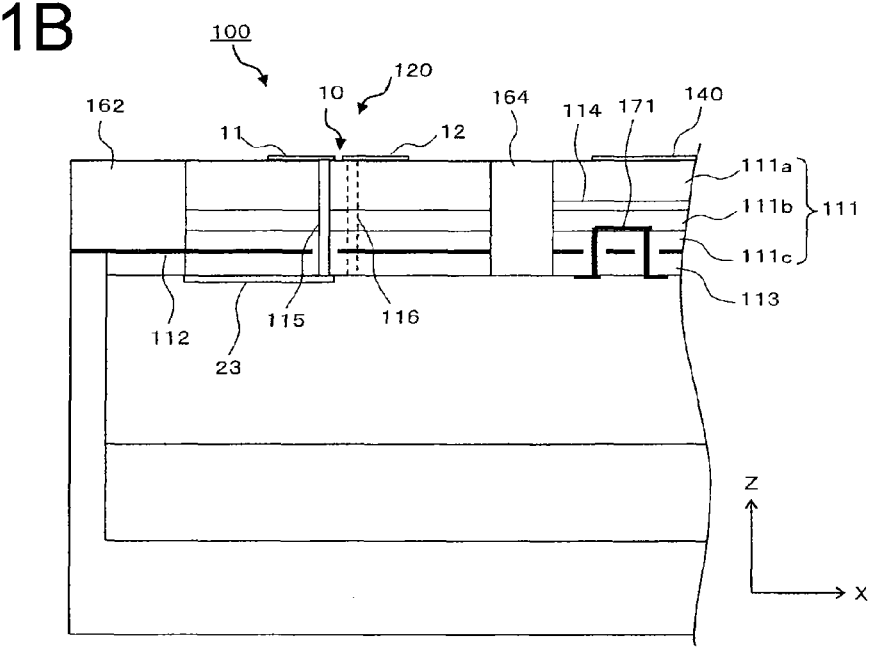

The built-in transmitting and receiving integrated radar antenna of a first embodiment of the invention is configured such that the bias line 171 of the MIC is built in the transmitting and receiving integrated antenna 102 shown in FIG. 4 (second configuration). FIG. 1 shows the configuration of the built-in transmitting and receiving integrated radar antenna 100 of the first embodiment. FIG. 1A is a plan view of the built-in transmitting and receiving integrated radar antenna 100 of the embodiment and FIG. 1B is a partial section view taken along a section passing through the feeding port 115 and the grounding port 116 on the side of the transmitting antenna 120.

Similarly to the built-in transmitting and receiving integrated radar antenna 900 shown in FIG. 6, the first dielectric substrate 111 of the built-in transmitting and receiving integrated radar antenna 100 is formed into a three-layered structure of the first layer 111a, the second layer 111b, and the third layer 111c. The EBG 140 and the second ground plane 114 for example are disposed on both surfaces of the first layer 111a of the first dielectric substrate 111, and the bias line 171 is disposed between the second layer 111b and the third layer 111c. Still further, the first ground plane 112 and the microwave line 23 for example are disposed on both surfaces of the second dielectric substrate 113, thus forming a five-layered structure in terms of metal layers. The bias line 171 of the MIC is disposed between the second layer 111b and the third layer 111c in a same domain with the domain B of the built-in transmitting and receiving integrated radar antenna 900 shown in FIG. 6. Still further, the second ground plane 114 is disposed between the first layer 111a and the second layer 111b.

The built-in transmitting and receiving integrated radar antenna 100 of the present embodiment is configured to be able to built in the bias line 171 and the second ground plane 114 by forming the five-layered structure similarly to the built-in transmitting and receiving integrated radar antenna 900 shown in FIG. 6. In addition to that, as shown in FIG. 1B, the partition through-hole 164, the second ground plane 114 and the first ground plane 112 are electrically conductive. As a result, the domain in which the feeding port 115 is disposed is isolated from the domain B in which the bias line 171 is disposed by the partition through-hole 164 and the second ground plane 114. In the same manner, the partition through-hole 163, the second ground plane 114 and the first ground plane 112 on the side of the receiving antenna 130 are electrically conductive.

One example obtained by analyzing the electric field leaked to the domain B when the receiving antenna 130 is excited in the built-in transmitting and receiving integrated radar antenna 100 is denoted by a reference numeral 52 in FIG. 7. It can be seen that the leaked electric field 52 is reduced in the domain B as a whole in the present embodiment as compared to the leaked electric field 51 in the built-in transmitting and receiving integrated radar antenna 900. It can be seen that the leaked electric field is lowered by −19.8 dB in average in the built-in transmitting and receiving integrated radar antenna 100 as compared to the built-in transmitting and receiving integrated radar antenna 900 before the improvement by isolating the bias line 171 by the partition through-holes 163 and 164 and the second ground plane 114 and that the effect of the partition through-holes 163 and 164 is remarkable.

Figure 8A:
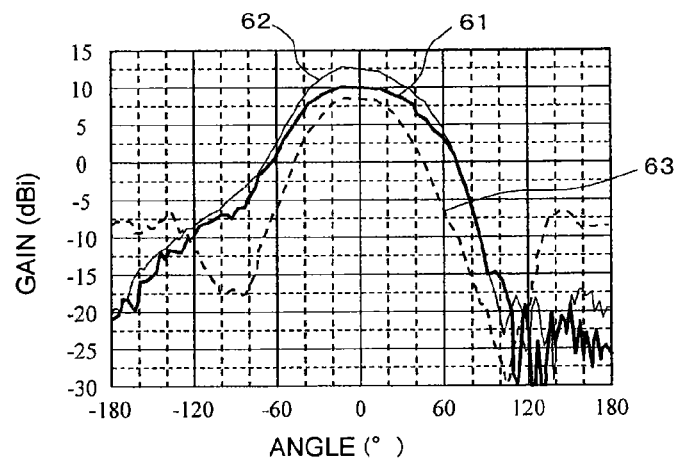
FIGS. 8A, 8B, and 8C are graphs respectively showing a sum pattern, a difference pattern and a discrimination curve obtained from a received wave of the built-in transmitting and receiving integrated radar antenna of the first embodiment of the invention.
Figure 8B:
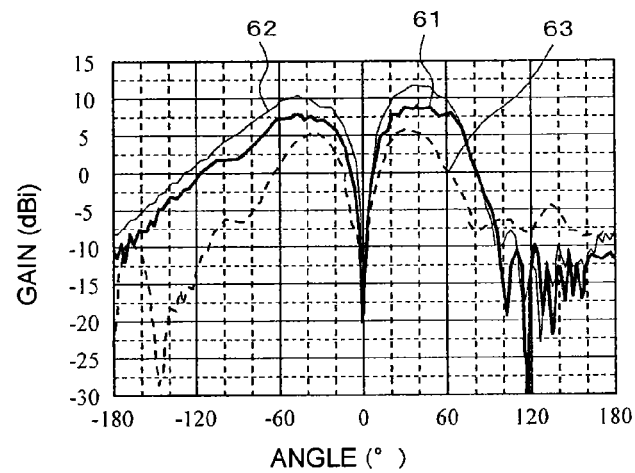
Figure 8C:
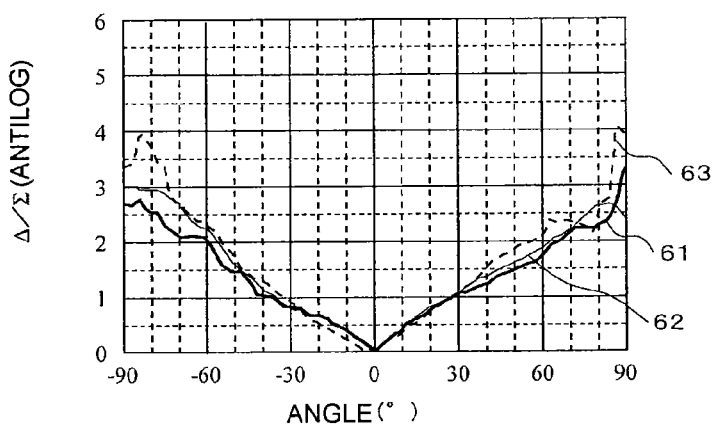

FIGS. 8A, 8B, and 8C show a sum pattern, a difference pattern and a discrimination curve obtained from a received wave of the receiving antenna 130 in the built-in transmitting and receiving integrated radar antenna 100. Here, actually measured values and analytical values obtained by simulations are denoted by reference numerals 61 and 62, respectively. Still further, actually measured values by the conventional receiving antenna configured by arraying printed dipole antennas of vertical polarization by 2×4 in the same manner with the array antenna described in Patent Document 1 are denoted by a reference numeral 63 for comparison.

The sum pattern in FIG. 8A, the differential pattern in FIG. 8B and the discrimination curve in FIG. 8C show that the actually measured values coincide well with the analytical values. Still further, as compared to the actually measured values 63 of the conventional receiving antenna, a high gain can be obtained in a wide coverage both in the sum pattern and the differential pattern in an Az plane (XZ plane) in the receiving antenna 130 of the present embodiment. Still further, as it is apparent from the discrimination curve shown in FIG. 8C, the sum pattern in FIG. 8A and the differential pattern in FIG. 8B, it is possible to obtain an angle measuring range wider than that of the conventional antenna by improving the gain and a signal-to-noise ratio (S/N). Thus, according to the built-in transmitting and receiving integrated radar antenna 100 of the present embodiment, it is possible to integrate the bias line 171 of the MIC onto the first dielectric substrate 111, i.e., the antenna substrate, and to improve the space factor while suppressing the unnecessary waves.

The built-in transmitting and receiving integrated radar antenna of the invention composes the transmitting and receiving antennas by arraying the plurality of element antennas whose main source of radiation is a magnetic current on the dielectric substrate and disposes the Eθ component thereof as the main polarization in the horizontal direction (XZ direction). Then, the built-in transmitting and receiving integrated radar antenna is characterized in that the metal layer such as the rim or EBG layer is disposed respectively in the vicinity in the X direction of the transmitting and receiving antennas. A typical element antenna whose main source of radiation is a magnetic current includes a patch antenna, other than the printed dipole antenna. A feeding method of the patch antenna includes a coplanar feeding method by means of a microstrip line, a vertical coaxial feeding method, an electromagnetic coupling feeding method and the like.

(Second Embodiment)

Figure 9A:
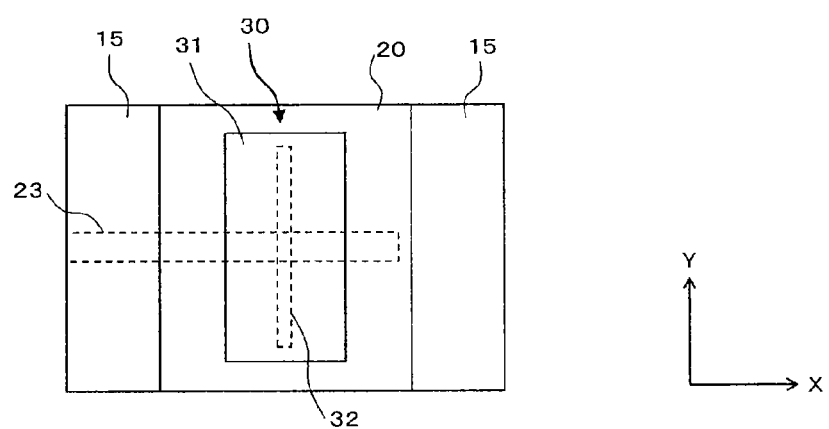
FIGS. 9A and 9B are plan and section views showing a configuration of an electromagnetic coupling patch antenna used as an element antenna of horizontal polarization whose radiation source is a magnetic current.
Figure 9B:
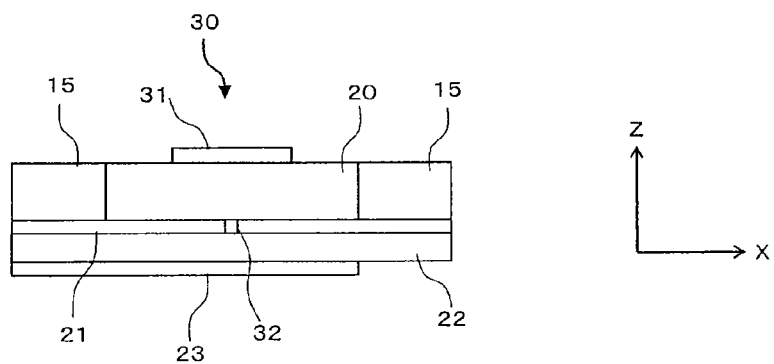

A built-in transmitting and receiving integrated radar antenna of a second embodiment of the invention will be explained below with reference to the drawings. Instead of the element antennas 10 of the printed dipole antenna used in the first embodiment, the electromagnetic coupling patch antenna as shown in FIG. 9 is used as an element antenna 30 in the built-in transmitting and receiving integrated radar antenna of the second embodiment. FIGS. 9A and 9B are plan and section views showing a configuration of the electromagnetic coupling patch antenna of horizontal polarization whose main source of radiation is a magnetic current. A patch antenna 31 is formed on the first dielectric substrate 20 in the element antenna 30 composed of the electromagnetic coupling patch antenna shown in FIGS. 9A and 9B. The patch antenna 31 is electromagnetically coupled with the microwave line 23 on the second dielectric substrate 22 through an electromagnetic coupling hole 32 formed on the ground plane 21. That is, electromagnetic energy of the microwave line 23 is excited to the patch antenna 31 through the electromagnetic coupling hole 32.

Figure 10A:
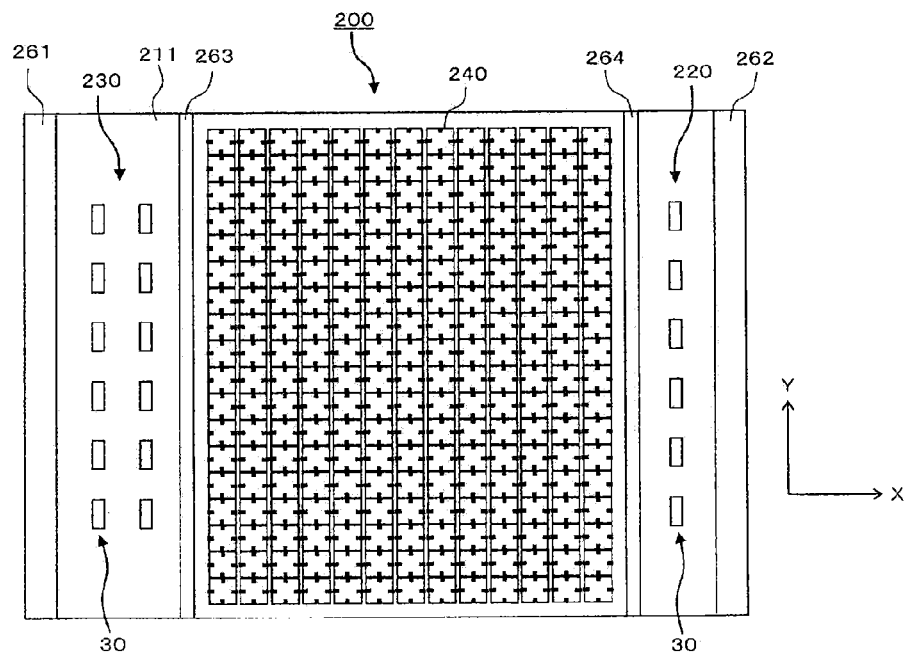
FIGS. 10A and 10B are plan and section views showing a configuration of a built-in transmitting and receiving integrated radar antenna of a second embodiment of the invention.
Figure 10B:
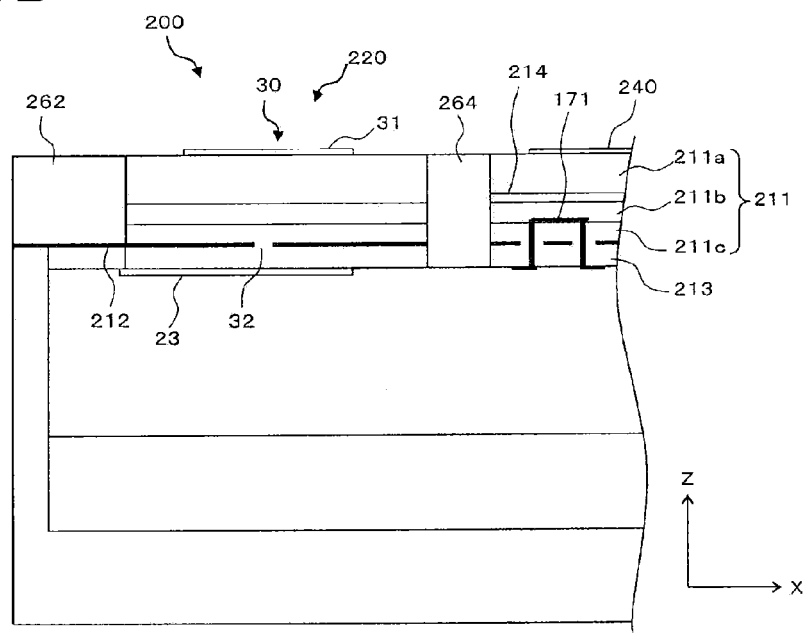

When the transmitting and receiving antennas are composed of the element antennas 30 described above, it is possible to integrate the transmitting and receiving antennas and to form a transmitting and receiving integrated radar antenna whose space factor and antenna performance are improved by disposing metal plates or EBGs 15 on both side surfaces thereof. FIGS. 10A and 10B show the built-in transmitting and receiving integrated radar antenna of the second embodiment using the element antennas 30. FIG. 10A is a plan view of the built-in transmitting and receiving integrated radar antenna 200 of the present embodiment and FIG. 10B is a partial section view taken along a section in the X-axis direction passing through the electromagnetic coupling hole 32 formed on a first ground plane 212 on the side of a transmitting antenna 220.

The built-in transmitting and receiving integrated radar antenna 200 forms the transmitting antenna 220 and a receiving antenna 230 by using the element antennas 30 and is configured by the array of the second configuration described above. That is, a rim 261, the receiving antenna 230, a partition through-hole 263, an EBG 240, a partition through-hole 264, the transmitting antenna 220 and a rim 264 are arrayed from a left side in FIG. 10A. Still further, the first dielectric substrate 211 is formed into a three-layered structure of a first layer 211a, a second layer 211b and a third layer 211c as shown in FIG. 10B. The EBG 240 and the second ground plane 214 for example are disposed on both surfaces of the first layer 211a of the first dielectric substrate 211, and the bias line 171 is disposed between the second layer 211b and the third layer 211c . The first ground plane 212 and the microwave line 23 for example are disposed on both surfaces of the second dielectric substrate 213. Thus, a five-layered structure is formed in terms of metal layers. Then, the second ground plane 214 is built in between the first layer 211a and the second layer 211b and the bias line 171 of the MIC is built in between the second layer 211b and the third layer 211c.

Similarly to the first embodiment, the partition through-hole 264, the second ground plane 214 and the ground plane 212 are electrically conductive also in the built-in transmitting and receiving integrated radar antenna 200 of the present embodiment. With this arrangement, the domain in which the element antenna 30 is electromagnetically coupled with the microwave line 23 and the domain in which the bias line 171 is disposed are isolated by the partition through-hole 264 and the second ground plane 214. In the same manner, the partition through-hole 263, the second ground plane 214 and the ground plane 212 on the side of the receiving antenna 230 are electrically conductive. With this arrangement, it is possible to integrate the bias line 171 of the MIC onto the first dielectric substrate 211 and to improve the space factor while suppressing unnecessary waves. It is also possible to obtain a high gain in the sum pattern and the differential pattern across a wide coverage and to realize a wide angle measuring range.

(Third Embodiment)

Figure 11A:
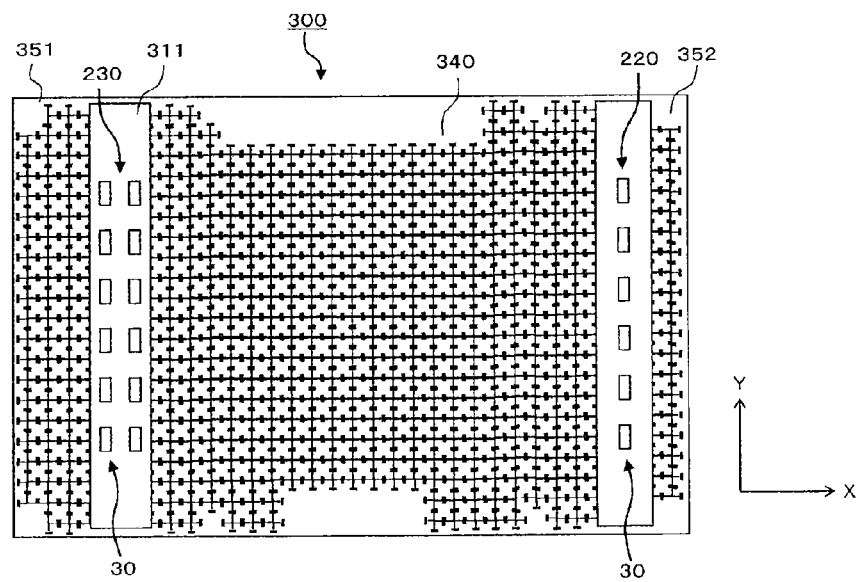
FIGS. 11A and 11B are plan and section views showing a configuration of a built-in transmitting and receiving integrated radar antenna of a third embodiment of the invention.
Figure 11B:
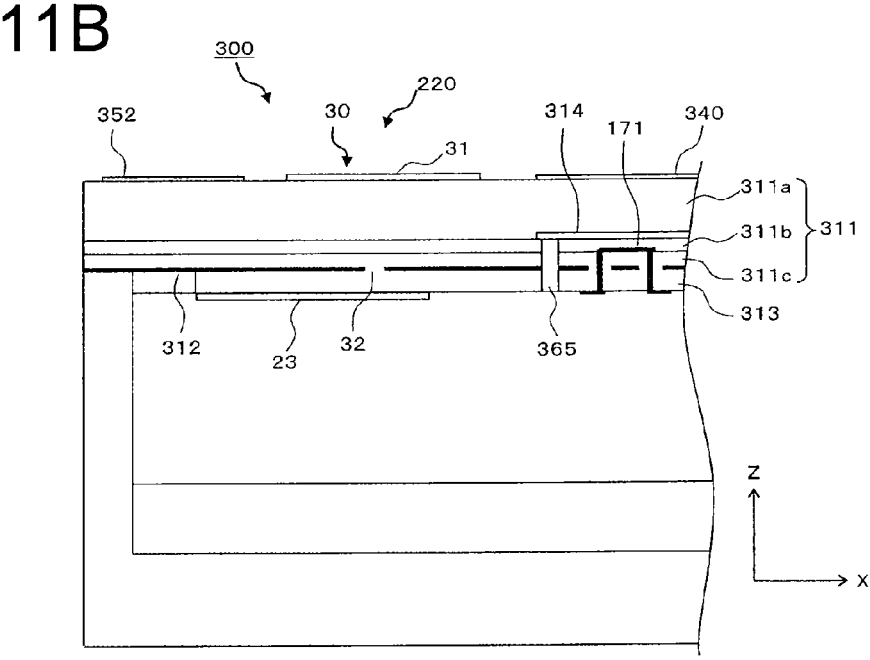

A built-in transmitting and receiving integrated radar antenna of a third embodiment of the invention will be explained below with reference to FIG. 11. Similarly to the second embodiment, the electromagnetic coupling patch antenna is used as the element antenna 30 in a built-in transmitting and receiving integrated radar antenna 300 of the third embodiment. FIG. 11A is a plan view of the built-in transmitting and receiving integrated radar antenna 300 of the present embodiment, and FIG. 11B is a partial section view taken along a section in the X-axis direction passing through the electromagnetic coupling hole 32 formed through a first ground plane 312 on the side of the transmitting antenna 220.

The built-in transmitting and receiving integrated radar antenna 300 forms the transmitting and receiving antennas 220 and 230 by using the element antennas 30 and is configured by the array of the first configuration described above. That is, an EBG 351, the receiving antenna 230, an EBG 340, the transmitting antenna 220, and an EBG 352 are arrayed from a left side in FIG. 11A. Still further, a first dielectric substrate 311 is formed into a three-layered structure of a first layer 311a, a second layer 311b and a third layer 311c as shown in FIG. 11B. The second ground plane 314 is built in between the first layer 311a and the second layer 311b, and the bias line 171 of the MIC is built in between the second layer 311b and the third layer 311c.

A small partition through-hole 365 conductively connected with the second and first ground planes 314 and 312 by penetrating through the second dielectric substrate 313 and the second layer 311b and the third layer 311c of the first dielectric substrate 311 is provided in the built-in transmitting and receiving integrated radar antenna 300 of the present embodiment. It is possible to eliminate the need for the partition through-holes 263 and 264 that penetrate through the first and second dielectric substrates 211 and 213 used in the second embodiment by providing the small partition through-hole 365 in the present embodiment. With this arrangement, it is possible to simplify steps for fabricating the first and second dielectric substrates 311 and 313 as compared to the case of providing the partition through-holes 263 and 264.

It is noted that while the element antennas whose source of radiation is the magnetic current and whose Eθ component is disposed in the horizontal direction as the main polarization have been explained in order to realize the widened coverage of the horizontal radiation pattern in the respective embodiments described above, element antennas whose main polarization is disposed in a vertical direction or an oblique direction may be applied to the built-in transmitting and receiving integrated radar antenna of the invention. It is also needless to say that the invention is not limited to a linear polarized wave but is applicable also to a circular polarized wave. Still further, although the bias line of the MIC is exemplified as the high-frequency circuit component, the high-frequency circuit component is not limited to the bias line and may be other signal lines or semiconductor functional parts. The description of the embodiments exemplifies the built-in transmitting and receiving integrated radar antenna of the invention and is not limited to that. The detailed configuration and operations of the built-in transmitting and receiving integrated radar antenna of the embodiments can be appropriately modified within a range not departing from the gist of the invention.

REFERENCE NUMERALS 10, 30 Element antenna
11 First element
12 Second element
13 Feeding through-hole
14 Grounding through-hole
15 Metal plate or EBG
20, 111, 211, 311 First dielectric substrate
100, 200, 300, 900 Built-in transmitting and receiving integrated radar antenna
22, 113, 213, 313 Second dielectric substrate
23 Microwave line
31 Patch antenna
32 Electromagnetic coupling hole
101, 102, 103 Transmitting and receiving integrated antenna
112, 212, 312 First ground plane
114, 214, 314 Second ground plane
115 Feeding port
116 Grounding port
120, 220 Transmitting antenna
130, 230 Receiving antenna
140, 151, 152, 240, 340, 351, 352 EGB
161, 162, 261, 262 Rim
163, 164, 263, 264 Partition through-hole
171 Bias line
365 Small partition through-hole

The invention claimed is:

1. A built-in transmitting and receiving integrated radar antenna, comprising:
a transmitting antenna disposed at one end side of one surface of a first dielectric substrate;
a receiving antenna disposed at another end side of one surface of the first dielectric substrate;
an EBG (Electromagnetic Band Gap) disposed between the transmitting and receiving antennas; partition through-holes respectively disposed between the transmitting antenna and the EBG and between the receiving antenna and the EBG;
a first ground plane formed on another surface of the first dielectric substrate; and a second dielectric substrate disposed on a surface on an opposite side from the first dielectric substrate across the first ground plane; characterized in that the first dielectric substrate is composed of at least three layers of a first layer, a second layer, and a third layer in order from the one surface side; a second ground plane is provided further by being disposed so as to oppose to the EBG across the first layer so that the second ground plane becomes a ground of the EBG; and the partition through-holes are electrically connected to the first and second ground planes by penetrating at least through the second and third layers of the first dielectric substrate and the second dielectric substrate.

2. The built-in transmitting and receiving integrated radar antenna according to claim 1, characterized in that the partition through-hole also penetrates through the first layer of the first dielectric substrate.

3. The built-in transmitting and receiving integrated radar antenna according to claim 1 or 2, characterized in that rims that penetrate through the first and second dielectric substrates and are electrically connected with the first ground plane are disposed respectively on both ends on one surface of the first dielectric substrate.

4. The built-in transmitting and receiving integrated radar antenna according to claim 1 or 2, characterized in that different EBGs are disposed respectively on the both ends on one surface of the first dielectric substrate.

5. The built-in transmitting and receiving integrated radar antenna according to claim 1, characterized in that a predetermined high-frequency circuit component is disposed between the second and third layers of the first dielectric substrate within a domain surrounded by the partition through-hole, the first ground plane and the second ground plane; and a predetermined MIC (microwave integrated circuit) disposed on the second dielectric substrate is connected to the high-frequency circuit component through a through-hole penetrating through the second dielectric substrate and the third layer of the first dielectric substrate without contacting the first ground plane.

6. The built-in transmitting and receiving integrated radar antenna according to claim 5, characterized in that the high-frequency circuit component is an either one of a bias line of the MIC, a predetermined signal line and a semiconductor functional component.

7. The built-in transmitting and receiving integrated radar antenna according to claim 1, characterized in that the transmitting antenna is formed by arraying two or more element antennas whose main source of radiation is a magnetic current and whose main polarization is E.theta. component in a direction parallel with one end surface of the first dielectric substrate; and the receiving antenna is formed by arraying two or more sets of element antennas in parallel with another end surface of the first dielectric substrate, each of the sets being two element antennas disposed in a direction orthogonal to the other end surface of the first dielectric substrate.

8. The built-in transmitting and receiving integrated radar antenna according to claim 7, characterized in that the element antenna has first and second elements disposed in the direction orthogonal to the end surfaces of the first dielectric substrate, the first element is connected with a predetermined microwave line through a feeding through-hole penetrating through the first and second dielectric substrates without contacting the first ground plane, and the second element is connected with the first ground plane through a grounding through-hole penetrating through the first dielectric substrate.

9. The built-in transmitting and receiving integrated radar antenna according to claim 7, characterized in that the element antenna is an electromagnetic coupling patch antenna and is electromagnetically coupled with a predetermined microwave line through an electromagnetic coupling hole created through the first ground plane.

\* \* \* \* \*

UNITED STATES PATENT AND TRADEMARK OFFICE
CERTIFICATE OF CORRECTION

| | |
|---|---|
| PATENT NO. | : 8,981,998 B2 |
| APPLICATION NO. | : 13/633209 |
| DATED | : March 17, 2015 |
| INVENTOR(S) | : Nobutake Orime et al. |

Page 1 of 1

It is certified that error appears in the above-identified patent and that said Letters Patent is hereby corrected as shown below:

On the title page, Item 73, the spelling of the Second Assignee's name is incorrect. Item 73 should read:

-- (73) Assignees:  Furukawa Electric Co., Ltd., Tokyo (JP);
                    Furukawa Automotive Systems Inc., Shiga (JP) --

Signed and Sealed this
First Day of December, 2015

Michelle K. Lee
*Director of the United States Patent and Trademark Office*